Figure 1:
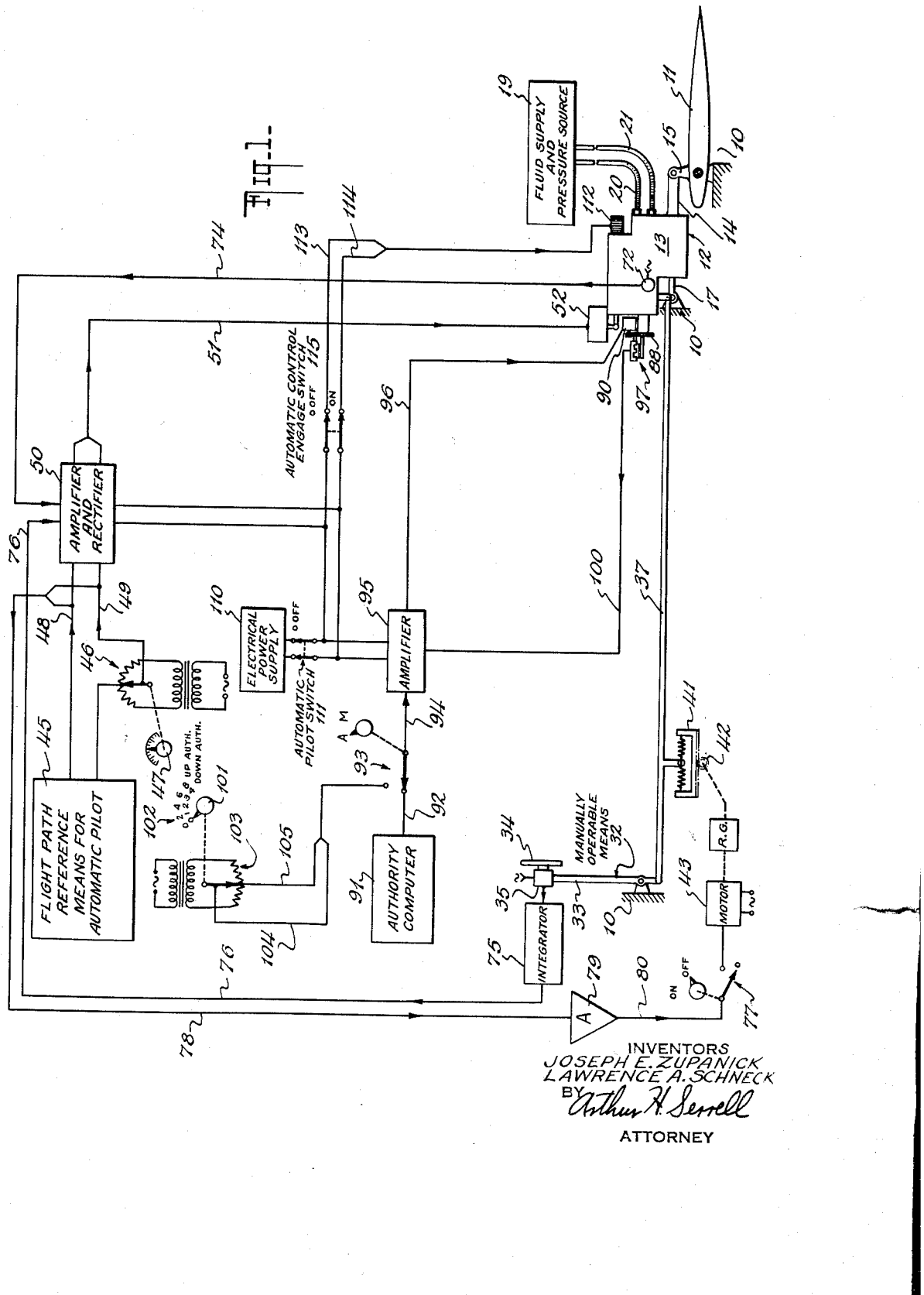

May 10, 1960

J. E. ZUPANICK ET AL 2,936,135

AUTOMATIC PILOT AND MANUAL BOOSTER CONTROL
SYSTEM FOR DIRIGIBLE CRAFT

Filed April 26, 1956

2 Sheets-Sheet 2

INVENTORS
JOSEPH E. ZUPANICK
LAWRENCE A. SCHNECK
BY
Arthur H. Serrell
ATTORNEY

United States Patent Office 2,936,135
Patented May 10, 1960

2,936,135

AUTOMATIC PILOT AND MANUAL BOOSTER CONTROL SYSTEM FOR DIRIGIBLE CRAFT

Joseph E. Zupanick, Garden City, and Lawrence A. Schneck, New York, N.Y., assignors to Sperry Rand Corporation, a corporation of Delaware Application April 26, 1956, Serial No. 580,957

20 Claims. (Cl. 244—77)

This invention relates to an automatic pilot and manual booster control system for dirigible craft. In the embodiment of the invention shown in the drawing, the improved control system is illustratively shown as employed on an aircraft in which the housing of the power motor of the system is operatively connected to a steering control means such as the elevators of the craft.

The rapid increase in the speed and performance capabilities of dirigible craft such as aircraft have made the problem of direct manual control of the craft over the complete flight range difficult due to greater control surface hinge moments and flutter problems. In order to convert the force of the human pilot to a level necessary to control the aircraft and to alleviate the flutter problem, a boosting power motor that may take the form of an hydraulic servomotor is incorporated in the control system. These boosters or power motors have solved the problem of providing sufficient human control effort for the steering members of the craft and effectively suppress the flutter problem. Where the system also includes an automatic system or pilot for controlling the craft steering means through the power motor, the respective manual and automatic controls are generally effected alternatively through the setting of a switch as shown and described in U.S. Letters Patent No. 2,678,177, issued May 11, 1954, to P. J. Chenery et al. In this disclosure, with the switch set in automatic pilot position, it was also possible for the human pilot to override the automatic pilot by directly overpowering the same through means of a flexible repeatback linkage connection to the stick. The primary object of the present invention is to provide an improved control system in which a mode of operation determining switch has been eliminated and where the system will accept inputs from the human and automatic pilots simultaneously or individually without the need of the flexible repeatback connection required in the teaching of the hereinbefore noted patent.

The improved dual control system features a multiple input actuator for the steering surface of a craft that is capable of accepting signals from an electrical automatic pilot or control system as well as the manual control effort of the human pilot as exerted through the conventional stick or manually operable member of the combination.

A further feature of the invention is the provision of a dual control system of the character described in which the effectiveness or degree of authority of the automatic pilot of the combination may be either automatically or manually adjusted in accordance with the flight condition of the aircraft.

Another feature of the invention resides in inclusion in the system of a stick feel device with a motor driven by the output of the automatic pilot to provide automatic trimming of the manually operable member or pilot's stick of the combination.

Still a further feature of the invention is included in the improved dual system of a monitoring means that is effective to zero the input from the electrical automatic pilot or control system component thereof under conditions of failure of the electrical power supply. Under such emergency condition, the system is operable in a manual boost mode affording the human pilot control of the steering members of the craft.

Another feature of the invention is provided by a second failsafe monitoring provision which directly connects the pilot's stick and craft control surface in the event of failure in the input pressure fluid to the hydraulic booster servomotor or power motor of the system, the monitor also functioning to zero any input to the system from the automatic pilot component under such condition.

Figure 2:
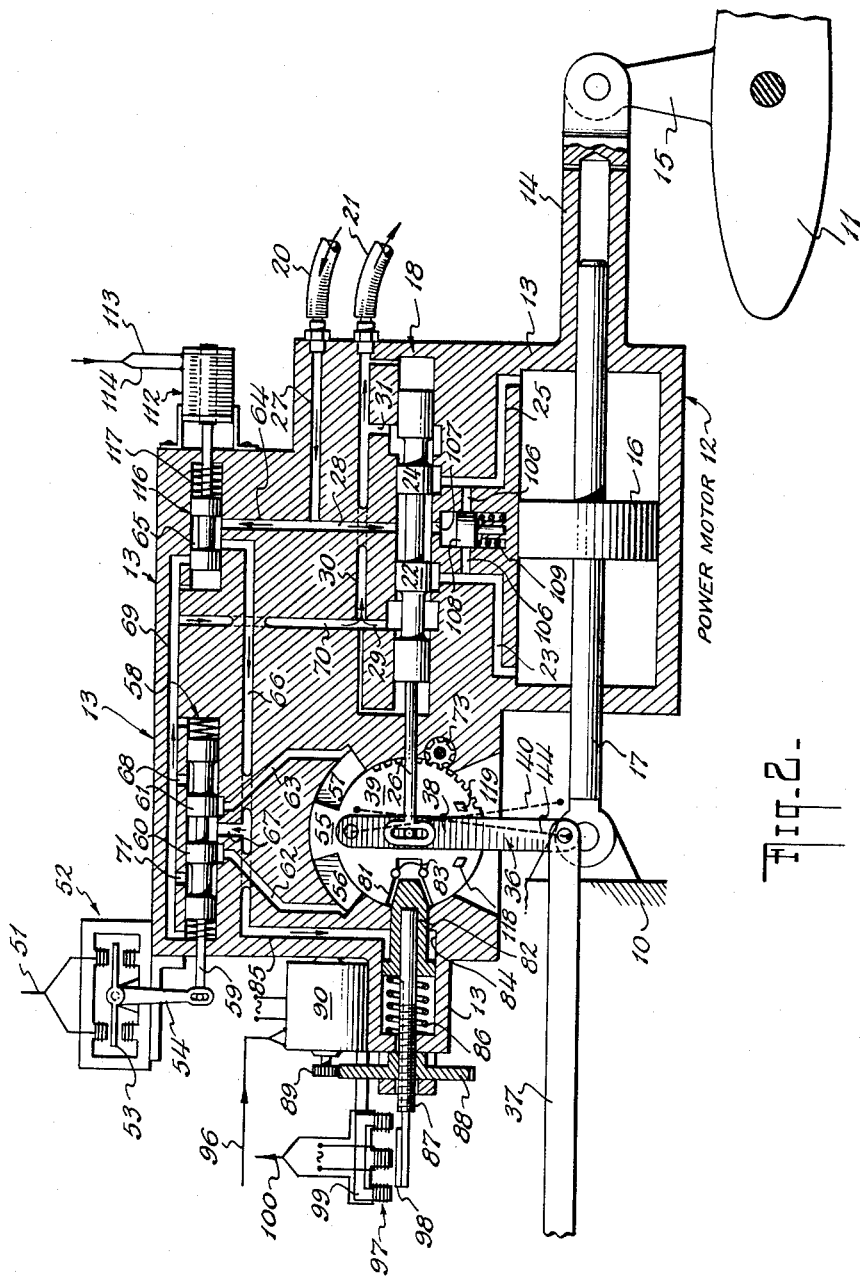

Other objects, features and structural details of the invention will be apparent from the following description when read in relation to the accompanying drawings in which:

Fig. 1 is a diagrammatic view showing the mechanical and electrical components forming the improved multiple input craft controlling servo system and the circuitry for the related electrical parts, and Fig. 2 is an enlarged vertical section of the control surface actuating unit of the combination.

With reference to the drawings, the relatively fixed locations of the frame of a dirigible craft having the improved system thereon are indicated at 10. The steering control means provided for the craft is constituted of a control surface 11 such as the elevators thereof operable to move the craft about its pitch axis. As shown, the steering control surface or member 11 is pivotally mounted on a portion of the fixed frame 10 of the craft, the surface being operatively connected to the movable element or housing of the booster power motor or hydraulic servomotor of the system. The power motor is generally designated at 12 in Fig. 2. The movable element or housing 13 of the servomotor 12 includes an extending arm 14 that in the structure shown is pivotally connected to a crank element 15 that is fixed in relation to the control surface 11. Housing 13 also provides a cylinder for the hydraulic servomotor or power motor 12 in which the piston element 16 thereof operates. One end of the piston rod 17 of the motor 12 extends exteriorly of the portion of the housing 13 defining the motor cylinder and is pivotally connected to the fixed frame 10 of the craft. Accordingly, translatory motion of the power motor housing 13 to the right as viewed in Fig. 2 with respect to the relatively fixed piston element 16 actuates the control surface in a clockwise direction to produce a down elevator control. Movement of the booster motor housing or movable element 13 to the left as viewed in Fig. 2 with respect to the piston element 16 correspondingly produces motion of the surface or elevator in a counterclockwise direction about its pivot axis and causes an up elevator control. The actuator for the steering member is accordingly constituted of the movable or housing element of the booster power motor or hydraulic servomotor 12. The relatively fixed element or piston part of the hydraulic servomotor 12 is pivotally connected to the frame 10 of the craft. The power motor or hydraulic servomotor 12 is operatively connected to the steering control member or surface 11 of the craft.

The element recited in the claims as means for operating the power motor or servomotor 12, shown in Fig. 2, is provided by a conventional spool type valve designated at 18 that is effective to control the supply of hydraulic fluid to and from the cylinder of the motor 12. As shown, a source of fluid supply and pressure, generally indicated at 19 in Fig. 1, which may be a conventional sump and hydraulic pump, provides fluid under pressure for the motor by way of intake hose connection 20. The return line to the fluid source 19 is provided by means of an output hose connection 21. Couplings are provided on the housing 13 of the motor for receiving the ends of the respective hose connections. Valve 18 is a translating piece that moves in a cylinder provided in the housing 13 from its neutral position, in which it is shown in Fig. 2, wherein the lands 22 and 24 cover the respective valve ports to the passageways 23 and 25 to the opposite ends of the cylinder of the servomotor. With movement of the valve spool 18 to the right, as viewed in Fig. 2, under control of the valve rod 26, high pressure fluid from the source 19 and connection 20 is admitted to the portion of the motor cylinder to the right of the piston 16 by way of intake passage 27, connecting passage 28, the area of the valve spool between the lands 22, 24 and passageway 25. At the same time, the fluid to the left of the piston 16 in the motor cylinder is connected to the fluid source 19 through the output hose 21 by way of passageway 23, the area of the valve spool to the left of land 22, exhaust passage 29, and connecting passage 30. The housing 13 of the power motor 12 is accordingly urged to the right to follow the movement of the valve 18 until the respective lands again cover the parts leading to passageways 23, 25 to restore the valve to a neutral condition. The follow-up movement of the housing element eliminates the separate need of a repeat back for the servomotor. When operated as described, the motor 12 urges the surface in a clockwise direction about its pivot to provide a condition of down elevator for the steering control member of the system. With translation of the valve spool means 18 to the left as viewed in Fig. 2, a reverse operation occurs. In this event, high pressure fluid is admitted to the portion of the motor cylinder to the left of the piston 16, by way of passageway 23, the area of the valve between the lands 22, 24, and passages 28, 27 to the intake pressure hose connection 20. At the same time, the portion of the cylinder to the right of the piston 16 is opened to the exhaust hose connection 21, by way of passageway 25, the portion of the valve spool to the right of land 24, and exhaust passage 31 to the passage 30 leading to the designated connection. The housing element 13 of the servomotor 12 is accordingly urged to the left, as viewed in Fig. 2, until the respective lands 22 and 24 again cover the ports leading to the cylinder passageways 23 and 25 to restore the valve to a neutral condition. The motion of the housing 13 again follows the initiating movement of the valve means to obviate the need of a repeatback for the motor. This movement results in counterclockwise rotation of the steering control member about its pivot to an up elevator condition.

Operation in the manner described of the booster motor 12 may be effected automatically through a directive control such as an automatic pilot as well as manually through the force exerted by the human pilot at the control stick which is herein designated as the manually operable means or member for controlling the means for steering the craft. In view of the fact, the drawings depict the system for use in controlling an aircraft about its pitch axis, the manual control means designated at 32, in Fig. 1, is provided by a pilot stick 33 that is pivotally connected to the frame 10 to move about an axis that may be parallel to the pitch axis of the craft. The stick 33, illustrated in Fig. 1, includes a wheel element 34 gripped by the pilot to move the same about its axis and a signal pick-off 35 of the character particularly shown in Fig. 4 of the U.S. Patent 2,398,421, issued April 16, 1946, to C. A. Frische et al. which provides an alternating current output that is in accordance with the force exerted by the human pilot on the wheel element 34 thereof. Referring to Figs. 1 and 2, the stick 33 is operatively connected to the valve 18 controlling the operations of the booster motor 12 by way of a summing means or differential 36 and a connecting element or link 37. The differential means shown in Fig. 2 consists of a rocker 38 that is connected to the valve 18 through a slot and pin connection, the slot of the connection being at the end of the valve rod 26 and the pin being on the rocker 38. The output of the differential 36 is communicated to the valve rod 26 to effect movement of the spool valve 18. One of the inputs to the summing means or differential is obtained from a rotary cylindrical actuator 39 which constitutes an adjustable means for varying or limiting the effectiveness or authority of the automatic pilot of the combination on the steering control member or surface 11 as hereinafter more particularly described. As shown in Fig. 2, the upper end of the differential rocker 38 is pivotally connected to the actuator 39, the connection communicating the automatic pilot output, as reflected in the angular position of the actuator, to the valve rod 26. The other input to the differential 36 is obtained from the manually operable means 32 by way of suitable interconnections such as the link 37, one end of which is pivotally connected to the end of the stick 33 and the other end of which is likewise connected to the end portion of the rocker 38 that extends below the housing 13 of the power motor. With no input from the automatic pilot, the rocker 38 moves about its upper pivot to assume the dotted line position indicated at 40 when the human pilot pushes forward on stick 33 resulting in rearward motion of the link 37. This causes the valve 18 to move to the right in Fig. 2 to effect a surface 13 condition of down elevator. The reverse action at the stick by the human pilot causes an up elevator condition also effected through the booster servomotor or power motor 12. The summing means or differential 36 of the system is carried by the housing or movable element of the servomotor 12.

To retain the feel of the stick for the human pilot in the booster system, a stick feel device is provided that, as shown in Fig. 1, includes a slide rack part 41 movable relatively to the craft with yieldable centralizing springs thereon that engage the stick 33 through an arm that extends from the link 37. The stick feel device is yieldingly connected to the manually operable means of the system. The position of the device with relation to the craft is determined by a driving gear 42 which meshes with the slide rack 41, the gear 42 being rotatable to change the trim position of the stick 33 by means of a drive motor 43 that is connected thereto by way of suitable shafting and reduction gearing as indicated. The means for trimming the stick 33 accordingly includes the described illustrative stick feel device. To move the stick 33 manually, it is only necessary for the human pilot to overcome the stored effort in the correspondingly affected centralizing spring of the illustrated stick feel device.

Operation of the system in the automatic mode is effected through movement of the rotary actuator 39 about its axis, the rocker arm 38 then pivoting about its connection to the link arm 37 as indicated by the dotted line position designated at 44. Corresponding motion of the slide valve 18 causes the power motor 12 to provide down elevator to correct the nose high condition sensed by the automatic pilot. For pitch axis regulation, the components of the automatic pilot herein illustrated may include a flight path reference means generally indicated at 45 that provides a controlling output signal with departure of the craft from the flight path or attitude condition determined by the reference means. Element 45 may consist of one or more components such as a gyro vertical with a pitch axis pick-off, an altimeter providing an output with departure of the craft from a reference altitude, a glide slope receiver providing an output with departure of the craft from a reference angle of attack and other conventional references applicable to control the craft about its pitch axis.

As shown in Fig. 1, the signal of the reference means 45 together with the signal output of a maneuvering command potentiometer 46 under control of the human pilot through the pitch knob 47 provides an input by way of leads 48, 49 to a suitable amplifier and rectifier indicated at 50. The direct current output of the amplifier and rectifier component 50 is fed by way of lead 51 to the windings of an automatic pilot servomotor 52. As herein shown, the servomotor 52 is a compound electrical direct current torque motor of the character described and shown in U.S. Letters Patent No. 2,426,608, issued September 2, 1947, to P. Halpert et al. The pole providing magnetic stator element of the motor 52 is shown in Fig. 2 as fixedly mounted on the movable element or housing 13 of the power motor 12. The movable element or armature 53 of the servomotor 52 is rockably mounted on the housing 13 for limited movement in the gaps between the pole faces of the stator element thereof. Arm 54 fixed to the armature 53 of servomotor 52 is effective as shown in Fig. 2 to control the movement of the cylindrical actuator 39 through means of a secondary hydraulic booster motor of the rotary type and in which the actuator constitutes the piston element. The segmental piston of the described motor is indicated at 55. The cylinder chambers for the piston 55 are contained in the housing element 13 for the servomotor 12 as indicated at 56 and 57. The control valve 58 for this secondary motor is also carried by the housing 13 in a cylindrical cavity therein, the valve having a valve rod 59 extending therefrom exteriorly of the housing 13 and being connected to the arm 54 of torque motor 52 by means of a suitable pin and slot connection. Centering springs are provided for normally maintaining the valve 58 in a neutral position in relation to housing 13 in which condition, the lands 60, 61 cover the valve ports communicating with the passageways 62, 63 to the respective chambers 56, 57. With a control signal from reference 45 in accordance with a nose high condition of the craft, the sensing of the torque motor 52 is such as to move the control valve 58 to the left as viewed in Fig. 2. High pressure fluid is communicated to the chamber 56 from intake hose 20 through passage 27, passage 64 connected to passage 27, open passageway 65, passages 66, 67, the central portion of the spool valve 58 and by way of passageway 62. At the same time, the chamber 57 is opened to the exhaust side of the hydraulic line by way of passageway 63, the area of the valve spool to the right of land 61, connecting passage 68 and passages 69, 70 to exhaust passage 30 and the output hose 21. This urges the piston actuator 39 in a clockwise direction to provide the input to the summing means or differential 36 from the automatic pilot that is effective to move the rocker to the dotted line position 44. As a result, the main servomotor 12 functions to provide down elevator to correct the nose up condition caused by the initial error signal from the automatic pilot. With reverse sensing of the automatic pilot, the opposite result is necessarily obtained. In this instance, the valve 58 is urged to the right, as viewed in Fig. 2, and fluid under pressure enters chamber 57 by way of passageway 63. Chamber 56 is then connected to the exhaust or output hose 21 by way of passageway 62, the portion of the spool valve to the left of land 60, and connecting passage 71 to exhaust passage 69. This urges the actuator 39 in a counterclockwise direction and moves the control valve 18 so that the servomotor 12 operates to cause the surface 11 to assume an up elevator position. With an automatic pilot input to the system such as to move the differential rocker 38 to the position indicated by the dotted line 44, for example, the rocker 38 pivots about its connection with manual link 37 at a fixed point as the piston actuator 39 turns about its axis to move the upper pivot of the rocker 38 to the right as viewed in Fig. 2. The actuator 39 also moves with the housing 13 to follow up the motion of the valve 18. Accordingly, when the pin on the rocker 38 assumes a position on the line 44, the housing 13 has also been moved correspondingly to the right and the valve 18 in neutral condition blocks the flow of fluid to the booster power motor 12 with the surface 11 in a down elevator condition. As the craft responds to this condition, the input to the system from the automatic pilot is restored to null and the actuator 39 reassumes its initial central position as shown in full lines in Fig. 2. In relation to the control valve 18, the automatic pilot input to the system accordingly also has a mechanical feedback incorporated therein. Because of this feature, it is possible to eliminate any changeover control from the respective manual and automatic modes of operation of the system. Also, the manual and automatic pilot inputs to the system can be supplied simultaneously without the need of any complicated interacting mechanism to facilitate overriding.

The improved system includes provision of a repeat-back control means for the automatic pilot component thereof. As shown, such means includes a signal pick-off 72 or electrical synchro of the selsyn type whose stator is fixedly mounted on the housing element 13 of the servomotor 12 as indicated in Fig. 1. The rotor of the pick-off is driven by a gear 73, Fig. 2, that meshes with a toothed portion of the cylindrical actuator 39. The pick-off produces a signal whose magnitude is dependent on the extent of the turning motion of the actuator 39 from a neutral condition and whose phase depends on the direction of the rotation. The feedback output of the pick-off 72 is fed to amplifier and rectifier 50 by way of lead 74 in opposition to the input to this element from the reference signal means 45. To facilitate maneuvering the craft through the stick 33 or manually operable means 32 in lieu of the pitch control knob 47, the output signal obtained from pick-off 35 at the stick 33 is fed the automatic pilot in opposition to the controlling input signal from the reference means 45. As shown, this signal after integration in a suitable integrator 75 is fed to amplifier 50 by way of lead 76. To trim the stick 33 either in the manual mode or automatic pilot mode of operation of the system, the automatic trim switch 77 is turned to a closed position, and the output of the reference means 45 of the automatic pilot fed by way of lead 78, amplifier 79, lead 80 and the closed switch 77 is utilized to operate the trimming motor 43 to move the rack correspondingly. In the manual mode of operation, the trimming motor operates to remove the tension in the stick feel device initiated by the pilot at the stick in commanding the maneuver. In the autopilot mode of operation, with the maneuver initiated by turning the control knob 47, the trimming motor operates through the stick feel device to move the free stick to maintain the same in correct trim. Automatic trim operations of the stick 33 may be disabled by turning the switch 77 to its "off" position.

The rotary actuator 39 of the improved system further includes a limit providing part therein in the form of a slot 81 that in cross section has the general conformation of a sectorial opening in the cylindrical body of the actuator. A stop means or element in the form of translatable plunger 82 carried in the housing 13 cooperates with the limit providing part. This structure also includes a centralizing part thereon shown as two-spaced pins 83 in the slotted area 81 of the actuator that are engageable by the tapered sides of the plunger 82. The spaced radial walls of the slotted area limit the angular motion of the actuator 39 within the housing 13 in relation to the stop element 82 and accordingly the input to the summing means or differential 36 of the system from the automatic pilot. This structure constitutes a variable coupling means or an input modifying means that is situated between the automatic pilot servomotor and the differential or summing means of the system. The automatic pilot servomotor may be construed as either servomotor 52 or the secondary hydraulic booster servomotor of which the actuator 39 is the movable piston element. The structure also provides a means for limiting the effectiveness or varying the degree of angular authority in the input of the differential from the automatic pilot component of the system.

The degree of authority determined by the described variable coupling is adjusted by changing the spacing between the tapered end of the stop plunger 82 and the adjacent radial walls of the slot 81. Movement of the plunger 82 to a position in which the same engages the pins 83 in the actuator centralizes the actuator 39 in relation to the housing 13 and zeros any input to the differential from the automatic pilot. Translation of the plunger 82 to the left as viewed in Fig. 2 increases the spacing between the walls of the slot 81 and the tapered end of the plunger and accordingly increases the range of operation of the actuator 39 as controlled by the automatic pilot input to the system.

The stop part of the variable coupling means of the system shown in Fig. 2 as plunger 82 is a piston member that is translatably movable in a cylinder 84 formed in the housing part 13. The portion of the cylinder 84 to the right of the flanged portion of the plunger defining the piston is connected to the high pressure fluid intake hose 20 by way of passage 85 which connects with high pressure fluid passage 66. The pressure normally existent in the cylinder 84 urges plunger 82 to the left as viewed in Fig. 2 to compress the spring 86 and seat the plunger against the end of a rod 87 that in the structure shown extends into a cylindrical opening therein. Rod 87 is a translatably movable piece that is located in coaxial relation to the axis of the cylinder 84. An axially extending keyway in the rod engages a key fixed to the housing 13 to prevent the rod from turning in relation to the housing. The axial position of rod 87 relative to the housing 13 accordingly normally determines the spaced relation between the plunger 82 and the slotted portion of the actuator 39. The means provided to adjust or change the setting of the slide rod 87 and plunger 82 associated therewith is constituted of the threaded end of the rod 87 and a drive gear 88 meshing therewith. As shown, the rotatably mounted gear 88 is turned by a gear 89 driven by a suitable motor 90 that is also included as a part of the adjusting means. The means furthermore includes either automatically or manually operable controls for regulating the operation of the drive motor 90. In this regard, an authority computer as designated at 91, in Fig. 1, provides a signal output for the motor 90 by way of lead 92, switch 93 closed to the automatic control input position, lead 94, amplifier 95 and lead 96 to the control windings thereof. A repeat-back in this loop of the improved system is provided by a pick-off or signal generator 97 of the type indicated for pick-off 35 whose armature 98 is located in a fixed manner on an extension of the rod 87 and whose stator 99 is fixedly mounted on the housing element 13. The described loop functions to operate the motor 90 to set the plunger 82 in accordance with the signal of the computer 91, the motor 90 being effective until the signal from the pick-off 97 fed to amplifier 95 by way of lead 100 balances the signal input to the amplifier from the computer at which point the motor stops and the plunger is automatically positioned. The computer 91 of the combination varies the degree of authority or effectiveness of the automatic pilot in the combination automatically to thereby avoid overstressing the craft in automatic operation under widely varying flight conditions. The factors effecting the craft considered by the computer 91 may include impact pressure, altitude, Mach number and air density.

As indicated in Fig. 1, regulation of the motor 90 may also be effected by the human pilot by the manual setting of a control knob 101 with relation to an up-down authority degree scale as designated at 102. Knob 101 controls the output of a bridged potentiometer 103 whose output by way of leads 104, 105 is supplied to the amplifier 95 through the switch 93 which is now closed at the manual authority input position. With knob 101 set at the zero authority position, the motor 90 is conditioned such that the plunger 82 is located in its centralizing position wherein it engages the pins 83 and removes any input to the system from the automatic pilot. As the knob 101 is moved in a clockwise direction to the desired setting, the motor 90 operates to move the rod 87 to the left and permit the plunger 82 to move correspondingly under the influence of the fluid pressure in the cylinder 84. When the proper knob setting has been reached, the motor 90 stops operating and the plunger is conditioned to limit the authority of the automatic pilot in the system to the degree desired.

The improved system includes provisions for enabling the human pilot to maintain control of the steering means 11 of the craft with failure in the input pressure fluid supply to the hydraulic servomotor or motive means 12 as well as upon failure in the electrical power supply to the automatic pilot.

Relative to failures of the hydraulic type, the plunger 82 of the authority control means of the system constitutes a normally ineffective means for zeroing the input to the summing means or differential 36. The spring 86 of this arrangement provides a monitoring means that operates to render the normally ineffective zeroing means effective upon failure in the input pressure fluid supply to the hydraulic motive means. With loss in operating fluid pressure due to failure in the fuel pump or a break in the supply line, the loss in pressure in the intake hose 20 is reflected in all the pressure passages in the housing 13. Such passages are passages 27, 28, 64, 66, 67 and 85. With loss in pressure to the right of the plunger piston 82, the compressed spring 86 moves the plunger 82 to the right so that the tapered end thereof engages the pins 83 of the actuator and centralizes the same. This operation accordingly zeros the input to the system from the automatic pilot. At the same time, the valve blocked passageway 106 between passages 23 and 25 to the cylinder ends of the power motor 12 is opened to equalize the pressure on either side of the piston 16 thereof. As shown in Fig. 2, high pressure passage 107 which communicates with the intake hose 20 by way of passages 27, 28 and the central portion of the spool type valve 18 between lands 22 and 24 is normally effective to locate the valve 108 in blocking relation in the passageway 106 against the effort of the compressed spring 109. When the pressure in the cylinder area above the valve 108 decreases, the spring 109 is effective to open the passageway 107 under conditions of failure of the hydraulic end of the system.

The spring 86 and plunger 82 arrangement are effective in the manner described to also centralize or zero the actuator 39 upon failure in the electrical power supply to automatic pilot. In this connection, an electrical power supply is indicated at 110 in Fig. 1. As shown, with the automatic pilot switch 111 closed, energy is supplied by suitable leads to amplifier and rectifier 50 and amplifier 95 of the system from the supply 110. Also, energy is fed by the supply 110 to a solenoid 112 by way of leads 113 and 114 with the automatic control engage switch 115 in an engaged or on condition. Energized solenoid 112 normally maintains the spool type valve 116 in a condition in the cylindrical cavity in the housing element 13 wherein the spring 117 at one end thereof is compressed. In its normal position as shown in Fig. 2, the area between the lands of the spool type valve provides an opening that connects high pressure passage 64 with passage 66 so that fluid under pressure is supplied to both valve 58 and cylinder 84 from the intake hose 20. The solenoid 112 senses an electrical failure in the power supply to the automatic pilot and is included as a portion of the monitoring means effective to zero the input to the system in the event of failure of this character. With the solenoid no longer energized upon such failure, the spring 117 moves the spool valve so that the right hand land thereof covers the end of the passage 64 and accordingly blocks the supply of high pressure fluid to the passages 66 and 85. At the same time, the left hand land of the spool valve 116 uncovers the exhaust passage 69 to its cylinder and connects the same with the passages 66 and 85 through the open area thereof between the lands. The action of spring 86 then moves the plunger 82 along rod 87 to engage the pins 83 of the actuator 39 to centralize this member and accordingly zero the input to the system from the automatic pilot under such condition. With electrical failure of the automatic pilot power supply only, the human pilot retains control of the steering member 11 through the booster power motor 12.

In the improved system, when the power motor 12 is rendered ineffective due to failure in this hydraulic input fluid supply, the human pilot still retains direct manual control over the steering member through the stick 33. In this event, a part of the differential rocker 38 is adapted to engage either of the additional limit providing lug parts 118, 119 on the variable authority actuator element 39 to move the housing element 13 and accordingly actuate the steering surface 11.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a dirigible craft with a steering control member, a manual booster and automatic pilot servo system; the combination of, a power motor operatively connected to the steering control member, a manually operable control member, automatic pilot means including a servomotor, means for operating said power motor, differential means having two inputs and an output connection to said power motor operating means, a connection to the manually operable control member providing one of the inputs to said differential means, variable coupling means from the servomotor of said automatic pilot means providing the second input to said differential means, and means for adjusting said variable coupling means to control the degree of authority in the input to said differential means from the automatic pilot means.

2. In a combination automatic pilot and manual booster control system for dirigible craft with a power motor connected to the steering control means of the craft, a servomotor receiving the output of the automatic pilot, a manually operable means, summing means responsive to both the automatic pilot servomotor and manually operable means for operating said power motor, input modifying means between said automatic pilot servomotor and said summing means, and means for varying said modifying means to control the degree of authority in the system of the automatic pilot.

3. In an automatic pilot for dirigible craft with a steering control member, a source of control signal, a servomotor responsive to said signal source, a power motor connected to said steering control member, means for operating said power motor, an operative connection between said servomotor and said power motor operating means including adjustable means for limiting the effectiveness of the control signal on the steering control member when the control signal exceeds predetermined limits, said limiting means being adjustable for varying said limits, and means for controlling the adjustment of said limiting means whereby said limits are defined.

4. A combination of the class described including a power motor connected to operate a craft steering member, means for operating said power motor, an automatic pilot having a source of control signal and a servomotor responsive to said signal source, a variable authority element between said automatic pilot servomotor and said power motor operating means, and means for providing a repeatback signal for the automatic pilot comprising a pick-off having a driven part operatively connected to said variable authority element.

5. A combination of the class described including a power motor connected to operate a craft steering member, means for operating said power motor, an automatic pilot having a source of control signal and a servomotor responsive to said signal source, a variable authority element between said automatic pilot servomotor and said power motor operating means having a limit providing and centralizing part, an adjustable stop member cooperating with said variable authority element part, and means for controlling the adjustment of said stop member.

6. In a dirigible craft with a steering control member, a manual booster and automatic pilot servo system; the combination of, a power motor operatively connected to the steering control member, a manually operable control member, automatic pilot means including a servomotor, means for operating said power motor, differential means having two inputs and an output connection to said power motor operating means, a connection to the manually operable control member providing one of the inputs to said differential means, variable authority means from said servomotor providing a second input to said differential means having a limit providing and centralizing part, an adjustable stop member cooperating with said variable authority means part, and means for controlling the adjustment of said stop member.

7. In a combination automatic pilot and manual booster control system for dirigible craft with a power motor having an element operatively connected to the steering control means of the craft and an element connected to the craft, a servomotor on the element of said power motor connected to the steering control means of the craft receiving the output of the automatic pilot, a manually operable means, summing means carried by the element of said power motor connected to the steering control means of the craft responsive to both the automatic pilot servomotor and the manually operable means for operating said power motor, input modifying means carried by the element of said power motor connected to the steering control means of the craft between said automatic pilot servomotor and said summing means, and means for varying said modifying means to control the degree of authority in the system of the automatic pilot.

8. A combination of the class described comprising an hydraulic servomotor having a movable housing connected to a craft steering member, valve means in said housing for controlling the operation of said hydraulic servomotor, operating means for said valve means including a differential with two inputs having an output link connected to said valve means, a link to a manually operable means for the steering member providing one of the inputs to said differential, a rotary cylindrical actuator in said housing providing the second input to said differential having a limit providing part thereon, automatic pilot means for turning said actuator, translatable stop means in said housing having a part engaging with the limit providing part of said actuator to limit the turning movement thereof, and means for positioning said stop means to control the angular authority in the input to said differential from said automatic pilot means.

9. A combination of the class described comprising an hydraulic servomotor having a movable housing connected to a craft steering member, valve means in said housing for controlling the operation of said hydraulic servomotor, operating means for said valve means including a differential with two inputs having an output link connected to said valve means, a link to a manually operable means for the steering member providing one of the inputs to said differential, a rotary cylindrical actuator in said housing providing a second input to said differential having a limit providing part thereon, automatic pilot means for turning said actuator, translatable centralizing means in said housing having a part engaging the limit providing part of said actuator to centralize the actuator in relation to said hydraulic servomotor housing, and means for operating said centralizing means to zero the input to said differential from said automatic pilot means.

10. In a combination automatic pilot and manual booster control system for dirigible craft, a power motor having an element operatively connected to the steering control means of the craft and an element connected to the craft, means carried by said first element for operating said power motor, summing means having two inputs and an output connection to said power motor operating means, a rotary actuator carried by said first element responsive to the output of an automatic pilot providing one of inputs to said summing means, linkage means to a manually operable member in the craft for the steering control means providing the other of the inputs to said summing means, and means providing an input to the automatic pilot in accordance with the operation of said manually operable member.

11. In a combination automatic pilot and manual booster control system for dirigible craft, an hydraulic servomotor having a housing operatively connected to the steering control means of the craft and a piston part connected to the craft, valve means in said housing for controlling the operation of said hydraulic servomotor, summing means having two inputs and an output connection to said valve means, a rotary actuator carried by said housing responsive to the output of an automatic pilot providing one of the inputs to said summing means, linkage means to a manually operable member in the craft for the steering control means providing the other of the inputs to said summing means, and means providing an input to the automatic pilot in accordance with the operation of said manually operable member.

12. In a combination automatic pilot and manual booster control system for dirigible craft, a power motor connected to the steering control means of the craft, a servomotor receiving the output of the automatic pilot, a manually operable means, summing means responsive to both the automatic pilot servomotor and manually operable means for operating said power motor, and means providing an input to the automatic pilot in accordance with the operation of said manually operable means.

13. In a combination automatic pilot and manual booster control system for dirigible craft with a power motor connected to the steering control means of the craft, a servomotor receiving the output of the automatic pilot, a manually operable means, summing means responsive to both the automatic pilot servomotor and manually operable means for operating said power motor, and means for trimming said manually operable means including a stick feel device having a part yieldingly connected to the manually operable means and a motor connected to drive said part in accordance with the output of the automatic pilot to maintain said manually operable means correctly trimmed.

14. In a combination electrical automatic pilot and manual booster control system for dirigible craft, a power motor connected to the steering control means of the craft, an electrical power supply for the automatic pilot, a servomotor receiving an electrical control signal from the automatic pilot, manually operable means, summing means responsive to both the automatic pilot servomotor and manually operable means for operating said power motor, normally ineffective means between the automatic pilot servomotor and summing means for zeroing the input to said summing means from said servomotor, and monitoring means operable to render said zeroing means effective upon failure in the electrical power supply to the automatic pilot.

15. In a combination automatic pilot and manual booster control system for dirigible craft, an hydraulic motive means connected to the steering control means of the craft, an input pressure fluid supply to said hydraulic motive means, a servomotor receiving a control signal from the automatic pilot, manually operable means, summing means responsive to both the automatic pilot servomotor and manually operable means for operating said hydraulic motive means, normally ineffective means between the automatic pilot servomotor and summing means for zeroing the input to said summing means from said servomotor, and monitoring means operable to render said zeroing means effective upon failure in the input pressure fluid supply to the hydraulic motive means.

16. In a combination electrical automatic pilot and manual booster control system for dirigible craft, an hydraulic motive means connected to the steering control means of the craft, an input pressure fluid supply to said hydraulic motive means, an electrical power supply for the automatic pilot, a servomotor receiving an electrical control signal from the automatic pilot, manually operable means, summing means responsive to both the automatic pilot servomotor and the manually operable means for operating said hydraulic motive means, normally ineffective means between the automatic pilot servomotor and summing means for zeroing the input to said summing means from said servomotor, and monitoring means operable to render said zeroing means effective upon failure in the electrical supply to the automatic pilot and failure in the input pressure fluid supply to the hydraulic motive means.

17. In a combination electrical automatic pilot and manual booster control system for dirigible craft, a power motor connected to the steering control means of the craft, an electrical power supply for the automatic pilot, a servomotor receiving an electrical control signal from the automatic pilot, manually operable means, a differential having two inputs and an output for operating said power motor, a connection to the manually operable means providing one of the inputs to the differential, a variable authority connection from said servomotor providing a second input to said differential having a limit providing and centralizing part, and monitoring means effective to operate said centralizing part to zero the input to the differential from said servomotor upon failure in the electrical power supply to the automatic pilot.

18. In a combination automatic pilot and manual booster control system for dirigible craft, an hydraulic motive means connected to the steering control means of the craft, an input pressure fluid supply to said hydraulic motive means, a servomotor receiving a control signal from the automatic pilot, manually operable means, a differential having two inputs and an output for operating said hydraulic motive means, a connection to the manually operable means providing one of the inputs to the differential, a variable authority connection from said servomotor providing a second input to said differential having a limit providing and centralizing part, and monitoring means effective to operate said centralizing part to zero the input to the differential from said servomotor upon failure in the input pressure fluid supply to the hydraulic motive means.

19. In a combination electrical automatic pilot and manual booster control system for dirigible craft, an hydraulic motive means connected to the steering control means of the craft, an input pressure fluid supply to said hydraulic motive means, an electrical power supply for the automatic pilot, a servomotor receiving an electrical control signal from the automatic pilot, manually operable means, a differential having two inputs and an output for operating said hydraulic motive means, a connection to the manually operable means providing one of the inputs to the differential, a variable authority connection from said servomotor providing a second input to said differential having a limit providing and centralizing part, and monitoring means effective to operate said centralizing part to zero the input to the differential from the servomotor upon failure in the electrical supply to the automatic pilot and failure in the input pressure fluid supply to the hydraulic motive means.

20. In a combination normally effective automatic pilot and manual booster control system for dirigible craft, a power motor connected to the steering control means of the craft, a servomotor receiving a control signal from the automatic pilot, a differential having two inputs and an output for normally operating said power motor, a connection to the manually operable means providing one of the inputs to the differential, a variable authority connection from said servomotor normally providing a second input to said differential having limit providing and centralizing parts, monitoring means co-operating with said centralizing part to zero the input to the differential from said automatic pilot servomotor when the power motor of the booster system is ineffective, said differential having a part adapted to engage the limit providing part of said variable authority connection and thereby directly connect the manually operable means to the steering control means of the craft via the power motor.

References Cited in the file of this patent
UNITED STATES PATENTS

| | | |
|---|---|---|
| 2,131,824 | Spencer | Oct. 4, 1938 |
| 2,559,817 | Ashkenas | July 10, 1951 |
| 2,678,177 | Chenery et al. | May 11, 1954 |
| 2,773,660 | Rasmussen | Dec. 11, 1956 |
| 2,801,618 | Place | Aug. 6, 1957 |